(12) United States Patent
Leimer et al.

(10) Patent No.: US 10,703,060 B2
(45) Date of Patent: Jul. 7, 2020

(54) ARTICLES OF FOOTWEAR AND APPAREL HAVING A PARTIALLY FUSED FABRIC PORTION AND METHODS OF MAKING THE SAME

(71) Applicant: adidas AG, Herzogenaurach (DE)

(72) Inventors: Robert Leimer, Portland, OR (US);
Warren Freeman, Guangzhou (CN);
Angus Wardlaw, Nurmberg (DE);
Nicholas Groeneweg, Portland, OR (US); Henry Ling, Portland, OR (US)

(73) Assignee: adidas AG, Herzogenaurach (DE)

( * ) Notice: Subject to any disclaimer, the term of this patent is extended or adjusted under 35 U.S.C. 154(b) by 277 days.

(21) Appl. No.: 15/192,351

(22) Filed: Jun. 24, 2016

(65) Prior Publication Data

US 2017/0348935 A1    Dec. 7, 2017

(30) Foreign Application Priority Data

Jun. 2, 2016    (CN) .......................... 2016 1 0388509

(51) Int. Cl.
*A43D 8/00* (2006.01)
*A43D 11/00* (2006.01)
(Continued)

(52) U.S. Cl.
CPC ............ *B29D 35/0054* (2013.01); *A43B 5/02* (2013.01); *A43B 5/06* (2013.01); *A43B 23/026* (2013.01); *A43B 23/0215* (2013.01); *A43B 23/0225* (2013.01); *A43B 23/0235* (2013.01); *A43B 23/0245* (2013.01); *A43B 23/0255* (2013.01); *A43B 23/042* (2013.01); *B29C 43/184* (2013.01); *D04B 1/16* (2013.01); *D10B 2401/041* (2013.01); *D10B 2403/0114* (2013.01); *D10B 2403/021* (2013.01); *D10B 2403/032* (2013.01); *D10B 2501/043* (2013.01)

(58) Field of Classification Search
None
See application file for complete search history.

(56) References Cited

U.S. PATENT DOCUMENTS

| 2,641,004 A | 6/1953 | Whiting et al. |
| 3,311,692 A * | 3/1967 | Baird .................... B29C 59/02 264/284 |

(Continued)

FOREIGN PATENT DOCUMENTS

| WO | WO 2014/194070 A1 | 12/2014 |
| WO | WO 2015/100369 A1 | 7/2015 |
| WO | WO 2015/140259 A1 | 9/2015 |

OTHER PUBLICATIONS

Extended European Search Report dated Nov. 24, 2017 for European Application No. 16186117.4, 10 pages.

*Primary Examiner* — Jameson D Collier
(74) *Attorney, Agent, or Firm* — Sterne, Kessler, Goldstein & Fox P.L.L.C.

(57) ABSTRACT

An article of footwear can include an upper. The upper includes a knitted portion having yarns partially fused to adjacent yarns and filaments of the partially fused yarns that are partially fused to adjacent filaments. Methods for manufacturing an article of footwear including an upper having a partially fused knitted portions include applying heat with or without pressure to form the partially fused knitted portions.

17 Claims, 8 Drawing Sheets

(51) Int. Cl.

| | |
|---|---|
| *B29D 35/00* | (2010.01) |
| *A43B 23/02* | (2006.01) |
| *D04B 1/16* | (2006.01) |
| *A43B 5/02* | (2006.01) |
| *A43B 5/06* | (2006.01) |
| *A43B 23/04* | (2006.01) |
| *B29C 43/18* | (2006.01) |

(56) References Cited

U.S. PATENT DOCUMENTS

| | | | |
|---|---|---|---|
| 5,707,925 A * | 1/1998 | Akada | B41M 5/38257 |
| | | | 428/913 |
| 6,588,237 B2 | 7/2003 | Cole et al. | |
| 6,910,288 B2 | 6/2005 | Dua | |
| 2004/0118018 A1 | 6/2004 | Dua | |
| 2010/0199520 A1* | 8/2010 | Dua | A43B 1/04 |
| | | | 36/87 |
| 2011/0088282 A1 | 4/2011 | Dojan et al. | |
| 2011/0088285 A1* | 4/2011 | Dojan | A43B 1/04 |
| | | | 36/87 |
| 2012/0227282 A1 | 9/2012 | Hawkinson et al. | |
| 2012/0279260 A1* | 11/2012 | Dua | D04B 1/16 |
| | | | 66/171 |
| 2013/0255103 A1* | 10/2013 | Dua | A43B 1/04 |
| | | | 36/87 |
| 2013/0260104 A1 | 10/2013 | Dua et al. | |
| 2014/0272218 A1 | 9/2014 | Thomas et al. | |
| 2015/0047225 A1 | 2/2015 | Zavala et al. | |
| 2015/0104592 A1* | 4/2015 | Itoi | D03D 1/00 |
| | | | 428/35.2 |
| 2016/0021979 A1* | 1/2016 | Iuchi | A43B 23/0215 |
| | | | 36/45 |
| 2017/0071290 A1* | 3/2017 | Follet | A43B 23/026 |
| 2017/0071291 A1* | 3/2017 | Follet | A43B 23/026 |

\* cited by examiner

ARTICLES OF FOOTWEAR AND APPAREL HAVING A PARTIALLY FUSED FABRIC PORTION AND METHODS OF MAKING THE SAME

FIELD

The disclosed embodiments relate to footwear and methods of making footwear having a fabric portion with partially fused yarns and filaments.

BACKGROUND

Consumers desire articles of footwear that are durable, lightweight, and breathable. Durable articles of footwear function properly for an extended period of time. For example, durable articles of footwear can be both stretch and abrasive resistant. Lightweight articles of footwear minimize the weight carried by a user's feet, and breathable footwear can help wick sweat and heat away from an individual's foot. Both lightweight and breathability improve the articles of footwear's comfortability. But durable articles of footwear tend to be neither lightweight nor breathable. For example, durable articles of footwear can include a sole and an upper attached to the sole that is made of multiple materials (for example, leather or synthetic material) that add weight and decreases breathability of the article of footwear. Moreover, uppers made of multiple materials take longer to manufacture, increasing the manufacturing costs.

BRIEF SUMMARY

In some embodiments, a method of manufacturing an article of footwear includes applying heat and pressure to a knitted fabric to form a fused portion. The fused portion can have a tensile strength such that the fused portion displaces less than 10% of an unstressed dimension of the fused portion when a 100 N force is applied to the portion. The fused portion can also have a tear strength such that the portion does not tear when a 40 N force is applied to the portion. The method also includes forming an upper of the article of footwear from the knitted fabric comprising the fused portion. In some embodiments, the tensile strength is such that the portion does not plastically deform when a 150 N force is applied to the portion. In some embodiments, applying heat and pressuring to the knitted fabric can occur substantially simultaneously. In some embodiments, applying heat and pressuring can include pressing the knitted fabric between a pair of molds. In some embodiments, applying heat and pressure to the knitted fabric can include embossing the fused portion.

In some embodiments, the knitted fabric can be a sandwich mesh comprising a first layer, a second layer, and spacer yarns between the first layer and the second layer. In some embodiments, the first layer can include a thermoplastic; the second layer can include polyester and spandex; and the spacer yarns can include polyester. In some embodiments, the sandwich mesh comprises nylon and spandex.

In some embodiments, a method of manufacturing an article of footwear includes applying heat and pressure to a knitted fabric at a predetermined temperature and a predetermined pressure for a predetermined time period to form a partially fused portion. At least one of the predetermined temperature, the predetermined pressure, and the predetermined time period is selected based on a characteristic of the knitted fabric such that, after the applying heat and pressure to the knitted fabric, a portion of the knitted fabric comprises (a) yarns that are partially fused to adjacent yarns and (b) filaments of the partially fused yarns that are partially fused to adjacent filaments. The method also includes forming an upper of the article of footwear from the knitted fabric comprising the fused portion. Applying heat and pressuring to the knitted fabric can occur substantially simultaneously. Applying heat and pressuring can include pressing the knitted fabric between a pair of molds.

In some embodiments, an article of footwear includes an upper. The upper can include a knitted portion having (a) yarns partially fused to adjacent yarns and (b) filaments of the partially fused yarns that are partially fused to adjacent filaments. The knitted portion can be embossed. The knitted portion can be a sandwich mesh comprising a first layer, a second layer, and spacer yarns between the first layer and the second layer. In some embodiments, the first layer can include a thermoplastic; the second layer can include polyester and spandex; and the spacer yarns can include polyester. In some embodiments, the sandwich mesh comprises nylon and spandex. In some embodiments, the knitted portion includes a first plurality of yarns comprising a first material having a first melting temperature, and a second plurality of yarns comprising a second material having a second melting temperature different than the first melting temperature. In some embodiments, the knitted portion has a tensile strength such that (i) the knitted portion displaces less than 10% of an unstressed dimension of the knitted portion when a 100 N force is applied to the knitted portion and (ii) the knitted portion does not plastically deform when a 150 N force is applied to the knitted portion. The knitted portion can also have a tear strength such that the knitted portion does not tear when a 40 N force is applied to the knitted portion. In some embodiments, the upper is a one-piece upper. In some embodiments, the knitted portion extends from a forefoot region of the upper to a heal region of the upper.

BRIEF DESCRIPTION OF THE DRAWINGS/FIGURES

The accompanying drawings, which are incorporated herein and form a part of the specification, illustrate the embodiments and, together with the description, further serve to explain the principles of the embodiments and to enable a person skilled in the relevant art(s) to make and use the embodiments.

Figure 1A:
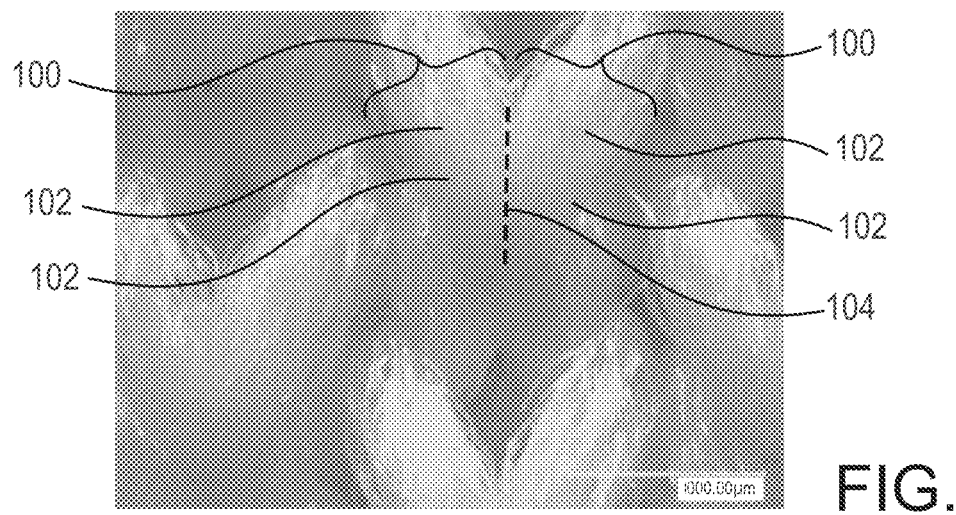
FIGS. 1A-1C are magnified views of knitted fabric that are (a) not fused, (b) partially fused, and (c) fully fused, respectively, according to an embodiment.

The features and advantages of the embodiments will become more apparent from the detailed description set

DETAILED DESCRIPTION

The disclosed embodiment(s) merely exemplify the invention. The scope of the invention is not limited to the disclosed embodiment(s). The invention is defined by the claims appended hereto.

The embodiment(s) described, and references in the specification to "an example," "for example," "one embodiment," "an embodiment," "an example embodiment," "some embodiments," "exemplary," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

An article of footwear can be multi-functional. For example, an article of footwear can provide cushioning to a user's foot, support a user's foot, and protect a user's foot. Each of these functions, alone or in combination, provides for a comfortable article of footwear suitable for use in a variety of scenarios (e.g., during leisure activities or during exercise or sports activities). The characteristics of an article of footwear (e.g., shape and materials used to make footwear) may be altered to produce desired characteristics, for example, durability, weight, and/or breathability. Durable footwear functions properly for an extended period of time, which instills a user's trust in specific manufacture's footwear and, in turn, leading to repeat sales. Lightweight footwear is comfortable for an individual and can improve athletic performance due to the decreased weight the individual carries on his or her foot. Breathable footwear increases individual's comfort by wicking sweet and heat away from an individual's foot. Designing footwear having a high degree of one or more of these characteristics without detrimentally affecting the other characteristics of the footwear is desirable. Accordingly, an article of footwear, or a portion thereof (e.g., an upper), may be configured to provide various degrees of durability, weight, and breathability. Also the cost to manufacturing an article of footwear is another design consideration. Footwear, or a portion thereof, that can be manufactured at a relatively low cost is desirable for manufactures and consumers. Footwear that can be manufactured using a relatively small amount of resources (e.g., energy and man power), materials, and time reduces manufacturing costs and may also reduce the environmental impact of manufacturing. Accordingly, designing footwear having a manufacturing cost is also desirable.

In some embodiments, the article of footwear includes an upper made, at least in part, of fabric—a sheet material made textile monofilament yarns, multifilament yarns and/or yarns that are, for example, woven, knitted, braided, netted, felted, plaited, laid, embroidered, or otherwise bonded together to give the material mechanical strength. For example, the fabric of an upper can be a knitted fabric made by interlocking series of loops of one or more yarns. For example, the fabric of an upper can be a woven fabric made of two series of yarn—warp and filling—that are interlaced to form the fabric. For example, the fabric can be nonwoven such that the filaments may or may not be interlaced with each other depending on the means of construction of the nonwoven fabric. In the context of this application, a "yarn" is a continuous strand made of a plurality of filaments that are twisted or otherwise held together, and correspondingly, a "filament" is the fundamental component of a yarn that, for example, can be spun into a yarn.

In some embodiments, the fabric of the upper can be a mesh, which may be open with holes or closed without visible holes. In the context of this application, a "mesh" is a fabric (e.g., knitted, woven, crocheted, laced, or knotted) having open spaces between the yarns. And in some mesh embodiments, the fabric of the upper can be a sandwich mesh. In the context of this application, a "sandwich mesh" is a multilayer layer fabric that includes at least a first layer of mesh, a second layer of mesh, and spacer yarns between the first and second layers of mesh that connects the first and second layers of mesh. The spacer yarns can be, for example, monofilament or multifilament.

In some embodiments, the fabric forming at least a portion of the upper includes a portion that is fused. In the context of this application, "fused" means yarns composing the portion and filaments composing those yarns are joined by melting. "Fused," without qualification, includes both "fully fused" and "partially fused" as explained next. In the context of this application, "fully fused" means that the yarns and filaments composing the yarns are melted such that the fabric portion is transformed into a unitary layer in which the yarns and filaments are no longer individually identifiable. In the context of this application, "partially fused" means the yarns and filaments composing the yarns are fused to a degree such that the yarns and the filaments are still individually identifiable after being fused. That is, the partially fused yarns and filaments do not melt and transform into a unitary layer in which the yarns and filaments are no longer individually identifiable. In some embodiments in which the fabric comprises low-melting-temperature and higher-melting-temperature yarns, the low-melting-temperature yarns of the partially fused portion melt completely such that the yarn structure of the low-melting-temperature yarns may not be visible, but the structure of the higher-melting-temperature yarns are still identifiable.

Figure 1B:
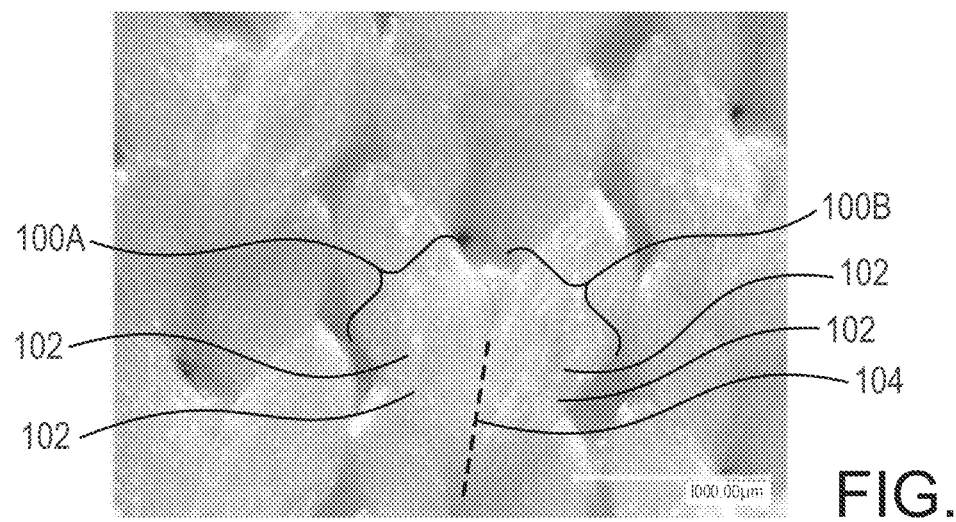
Figure 1C:
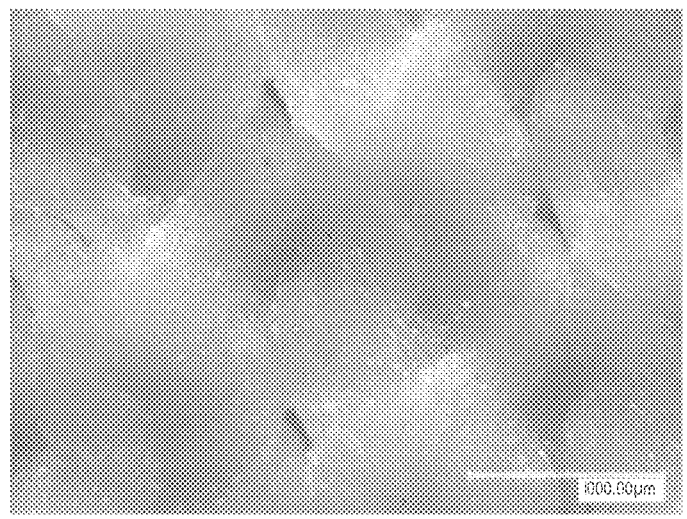

FIGS. 1A-1C illustrate magnified views of knitted fabric that are (a) not fused, (b) partially fused, and (c) fully fused, respectively, according to an embodiment. As seen in FIG. 1A, the yarns 100 and the filaments 102 composing the yarns 100 are not joined by melting—not fused—and each of the yarns 100 and each filament 100 composing the yarns are identifiable. In this unfused state, yarns 100 are not fused together at, for example, interface 104 and are free to move independently relative to each other, and the filaments 102 composing yarns 100 are not fused to adjacent filaments at their respective interfaces and are free to move independently relative to each other.

As seen in FIG. 1B, yarns 100 and the filaments 102 are partially fused. Yarns 100 and filaments 102 composing yarns 100 are melted to a degree such that yarns 100 and the filaments 102 composing these yarns 100 are still individually identifiable after being partially fused. For example, one yarn 100 is fused to an adjacent yarn 100 at interface 104, and filaments 102 composing yarns 100 are fused to adjacent filaments 102. In this partially fused state, the individual yarns 100 cannot move independently relative to adjacent yarns 100, and individual filaments 102 cannot move independent relative to adjacent filaments 102.

Yet in this partially fused state, yarns 100 and filaments 102 retain substantially at least some of the same mechanical properties (for example, tensile strength and tear strength) as yarns 100 and filament 102 in the unfused state, which is advantageous for footwear applications. For example, partially fused fabric portions have tensile and tear mechanical properties that are advantageous for footwear applications. Particularly, a partially fused fabric portion can have a tensile strength such that the partially fused portion displaces less than 10 percent of the partially fused fabric portion's unstressed dimension when a 100 N force is applied to the fabric portion. And a partially fused fabric portion can have a tensile strength such that the partially fused fabric portion does not plastically deform when a 150 N force is applied to the fabric portion. Additionally, a partially fused fabric portion can have a tear strength such that the portion does not tear when a 40 N force is applied to the portion. Accordingly, an upper of the article of footwear having a partially fused portion can have improved stretch and support characteristics without significantly compromising tear strength.

As seen in FIG. 1C, yarns 100 and filaments 102 (which are not identifiable in FIG. 1C) are fully fused. The yarns and the filaments composing the yarns are melted to a degree such that the yarns and the filaments are transformed into a unitary layer in which the yarns and filaments are no longer individually identifiable. In the fully fused state, the yarns and the filaments have substantially degraded mechanical properties relative to the mechanical properties of the same yarns 100 and filaments 102 in an unfused state. That is, fully fused fabric tends to be too brittle and too stiff for many footwear applications.

Figure 2:
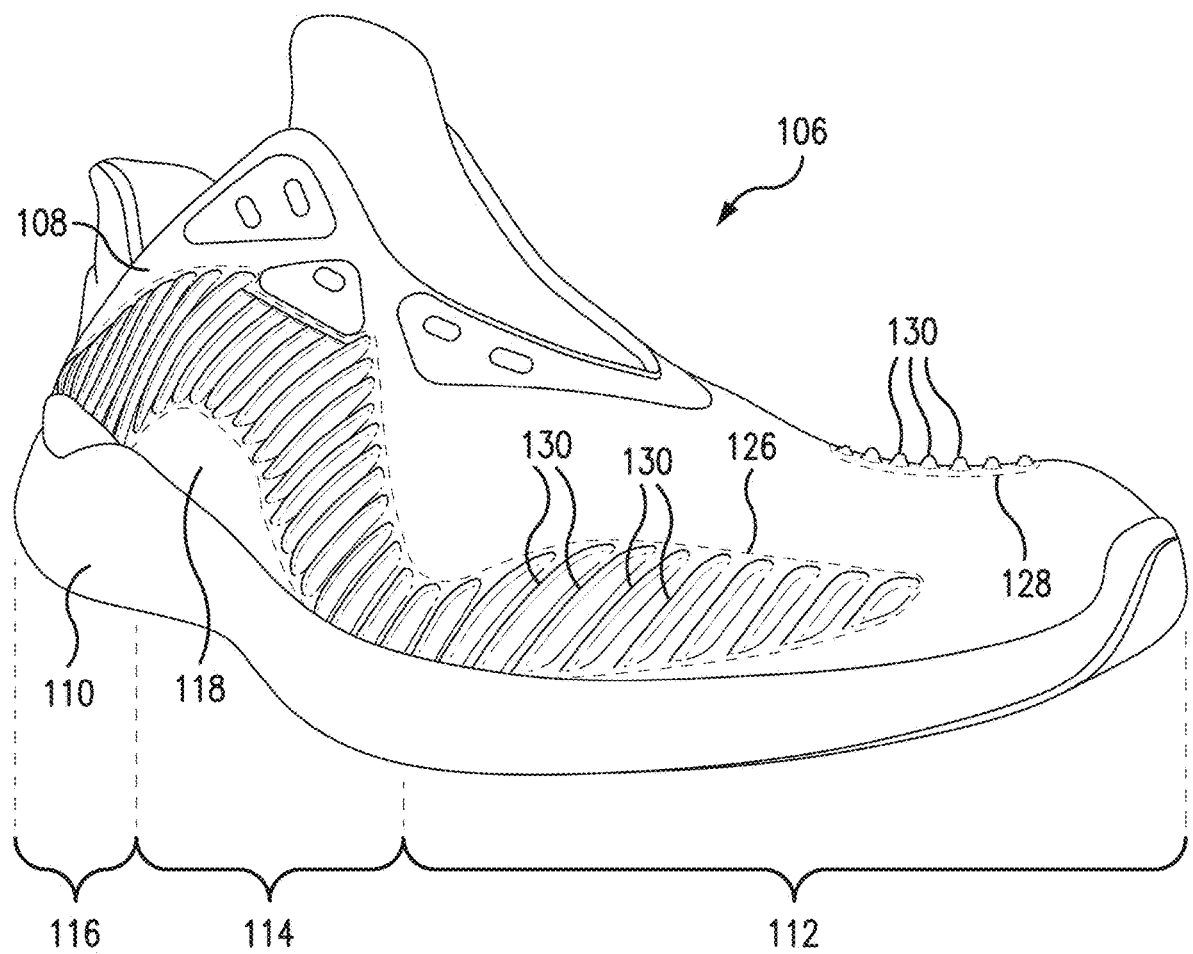
FIG. 2 is a perspective lateral side view of an article of footwear according to an embodiment.
Figure 3:
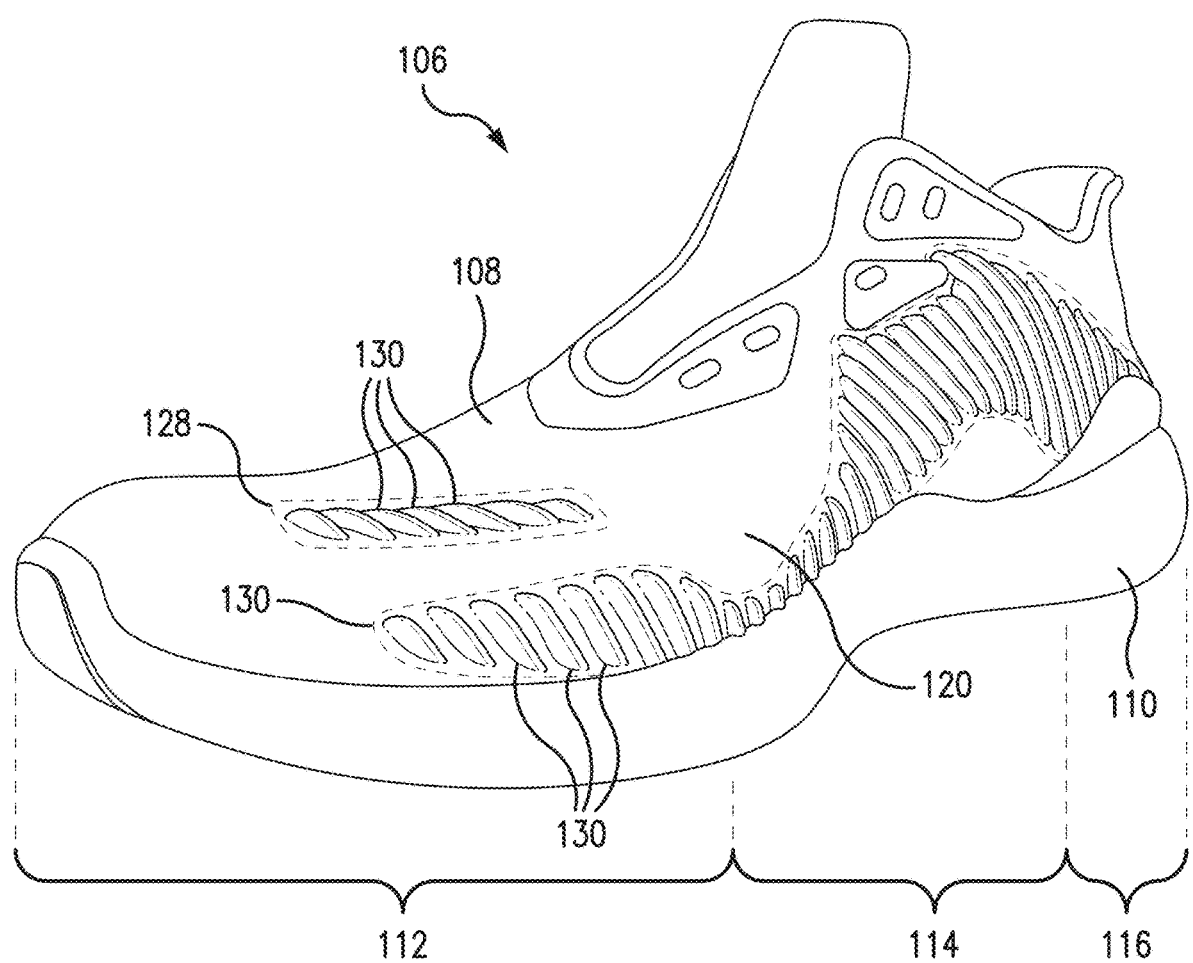
FIG. 3 is a perspective medial side view of an article of footwear according to an embodiment.
Figure 4:
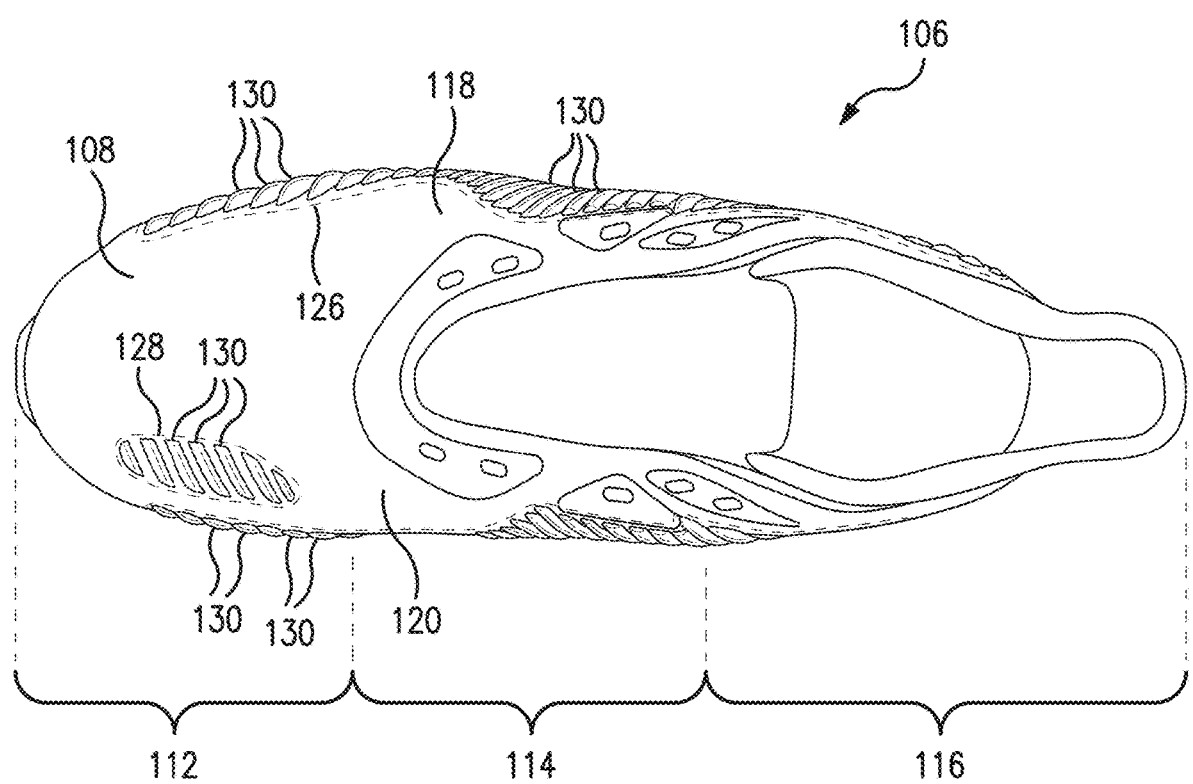
FIG. 4 is a plan view of an article of footwear according to an embodiment.

In some embodiments, article of footwear 106 includes an upper that has at least one fabric portion that has yarns partially fused to adjacent yarns and filaments of the partially fused yarns that are partially fused to adjacent filaments. For example, FIGS. 2-4 illustrate an article of footwear 106 according to one such embodiment. Article of footwear 106 includes an upper 108 and a sole 110 coupled to upper 108.

Article of footwear 106 includes a forefoot region 112, a midfoot region 114, and a heel region 116. Forefoot region 112 generally corresponds with the portion of article of footwear 106 that receives the toes and the joints that connect the metatarsals with the phalanges. Midfoot region 114 generally corresponds with the portion of article of footwear 106 that receives the arch of the foot. And heel region 116 generally corresponds with the portion of article of footwear 106 that receives the calcaneus bone. Regions 112, 114, and 116 are not intended to demarcate precise areas of article of footwear 106. Rather, regions 112, 114, and 116 are intended to represent general areas of article of footwear 106 that provide a frame of reference. And although regions 112, 114, and 116 apply generally to article of footwear 106, references to regions 112, 114, and 116 also may apply specifically to upper 108 or sole 110, or individual components of upper 108 or sole 110. Article of footwear 106 also includes a lateral side 118 (see FIGS. 2 and 4) and a medial side 120 (see FIGS. 3 and 4) that each extend from forefoot region 112 to heel region 116.

Upper 108 can be made, at least in part, of a fabric having at least one partially fused portion in which yarns are partially fused to adjacent yarns and filaments of the partially fused yarns are partially fused to adjacent filaments. For example, as shown in FIGS. 2-4, upper 108 has three discrete partially fused portions 126, 128, and 130. In other embodiments (not shown), upper 108 can have more than or less than three discrete partially portions.

As best seen in FIG. 2, partially fused portion 126 is on lateral side 118 of article of footwear 106. Partially fused potion 126 extends from forefoot region 112 to heel region 116. In other embodiments (not shown), partially fused portion 126 is located at only one or two of regions 112, 114, and 116. For example, partially fused portion 126 can be shaped to just be at forefoot region 112, or partially fused portion 126 can be shaped to just be at midfoot region 114 and heel region 116. In other embodiments (not shown), upper 108 can have three discrete partially fused portions at each of regions 112, 114, and 116 on lateral side 118. As best seen in FIG. 2, partially fused portion 126 has an undulated, non-linear shape. In other embodiments, partially fused portion 126 can have other shapes, for example, a linear shape, an arcuate shape, an oval shape, or a triangular shape.

As best seen in FIGS. 3 and 4, partially fused portion 128 is on medial side 120 and on top of forefoot region 112 of upper 108. For example, partially fused portion 128 can be positioned such that it overlaps the big toe of a user's foot received within upper 108. In other embodiments (not shown), partially fused portion 128 can extend from medial side 120 to lateral side 118. In some embodiments (not shown), partially fused portion 128 extends from forefoot region 112 to at least midfoot region 114. And in some embodiments (not shown), upper 108 can include more than one discrete and partially fused portions on top of forefoot region 112 of upper 108. As best seen in FIG. 4, partially fused portion 128 can have a substantially linear shape when viewed from above. In other embodiments, partially fused portion 128 can have other shapes, for example, a non-linear shape, a circular shape, a triangular shape, an undulating shape, an arcuate shape, when view from above. In some embodiments, partially fused portion 128 can cover substantially the entire top of forefoot region 112.

As best seen in FIG. 3, partially fused portion 130 is on medial side 120 of article of footwear 106. Partially fused portion 130 extends from forefoot region 112 to heel region 116. In other embodiments (not shown), partially fused portion 130 is positioned at only one or two of regions 112, 114, and 116. For example, partially fused portion 130 can be shaped to just be at forefoot region 112, or partially fused portion 126 can be shaped to just be at midfoot region 114 and heel region 116. In other embodiments (not shown), upper 108 can have three discrete partially fused portions at each of portions 126, 128, and 130 on medial side 120. As best seen in FIG. 3, partially fused portion 130 has an undulated, non-linear shape. In other embodiments, partially fused portion 126 can have other shapes, for example, a linear shape, an arcuate shape, an oval shape, or a triangular shape.

In some embodiments, instead of three discrete portions 126, 128, and 130 covering, at least in part, lateral side 118 from forefoot region 112 to heel region 116, the top of forefoot region 112, and medial side 120 from forefoot region 112 to heel region 116, upper can have one continuous partially fused fabric portion that covers each of these three areas. And in some embodiments, substantially the entire upper 108 is composed of partially fused fabric.

In some embodiments, upper 108 includes at least one partially fused fabric portion that is embossed. For example, one or more of partially fused portions 126, 128, and 130 can be embossed. As shown in FIGS. 2-4, each of partially fused portions 126, 128, and 130 includes a plurality of embossed portions 130 that are part of a repeating undulating pattern. As shown in FIGS. 2-4, embossed portions 130 are plurality of substantially linear ribs having a semi-circular cross-sectional shape, and embossed portions 130 are substantially evenly spaced apart from each other. In other embodiments, embossed portions 130 can be non-linear, have other cross-sectional shapes, or be part of a non-repeating or irregular pattern. Embossing portions of the partially fused fabric can provide additional structural support to upper 108. Additionally, embossing can be used to provide three-dimensional aesthetic designs in upper 108.

In some embodiments, upper 108 includes at least one partially fused fabric portion that has tensile and tear mechanical properties that are advantageous for footwear applications. For example, one or more of partially fused portions 126, 128, and 130 have tensile and tear mechanical properties that are advantageous for footwear applications. For example, each of partially fused portions 126, 128, and 130 has a tensile strength such that the respective partially fused portion displaces less than 10 percent of the respective partially fused fabric portion's unstressed dimension when a 100 N force is applied to the fabric portion. And in some embodiments, each of partially fused fabric portions 126, 128, and 130 also has a tensile strength such that the respective partially fused fabric portion does not plastically deform when a 150 N force is applied to the fabric portion. Additionally, each of partially fused fabric portions 126, 128, and 130 has a tear strength such that the respective portion does not tear when a 40 N force is applied to the portion in some embodiments. Uppers having partially fused portions with one or more of the above mechanical properties have desired compliance, breathability, and support to be used for footwear, for example, shoes for leisure, running, soccer, American football, and basketball. Uppers having partially fused portions with one or more of the above mechanical properties are not too brittle or stiff to be used in footwear applications.

Moreover, having at least one partially fused portion with one or more of the above mechanical properties allows upper 108 to be manufactured substantially as one unitary piece. In some one-piece embodiments, the fabric composing upper 108 is continuous from forefoot region 112 to heel region 116, and upper 108 is continuous from lateral side 118 to medial side 120. A one-piece upper 108 can reduce the total weight of article of footwear 106, improving user comfort and performance. And a one-piece upper 108 can reduce manufacturing costs by reducing the amount of required material and manufacturing time.

In some embodiments, upper 108 can include a knitted fabric that comprises the partially fused portion. For example, upper 108 can be made of a knitted mesh fabric. The knitted mesh fabric can be a single layer mesh fabric. Or the knitted mesh fabric can be a multi-layer sandwich mesh fabric.

In some knitted mesh embodiments, upper 108 can be made, at least in part, of a sandwich mesh fabric including an outer layer (i.e., facing away from the foot), an inner layer (i.e., facing the foot), and spacer yarns (e.g., a monofilament spacer yarns) in between the outer layer and the inner layer that connects the outer and inner layers.

In some sandwich mesh embodiments, the outer layer comprises one or more of polyester, polyamide (for example, nylon such as PA6), and segmented polyurethane (for example, spandex); the inner layer comprises one or more of polyester, polyamide (for example, nylon such as PA6), and segmented polyurethane (for example, spandex); and the spacer yarns comprise one or more of polyamide (for example, a nylon monofilament) or polyester (for example, a polyester monofilament). In some embodiments, any one of these materials can be a thermoplastic. In the context of this application, a thermoplastic is a material that has a lower melting point than other yarns used in the fabric. For example, the thermoplastic can be a thermoplastic polyester, a thermoplastic polyurethane (for example, an ether type 64 shore D TPU), a thermoplastic nylon such as PA6, a thermoplastic co-polyester, or a thermoplastic co-polyamide.

In one sandwich mesh embodiment, the outer layer is made of polyester, spandex, and nylon, the spacer yarns are nylon monofilament, and the inner layer is made of nylon. In some of such sandwich mesh embodiments, the total composition of the sandwich mesh is about 10 percent to about 20 percent (for example, about 15 percent) polyester, about 13 percent to about 19 percent (for example, about 16 percent spandex), and about 65 percent to about 75 percent (for example, about 69 percent) nylon. (In the context of this application, the percentage of the total composition of the respective fabric or layer being discussed is by weight unless indicated otherwise.) In other such sandwich mesh embodiments, the total composition of the sandwich mesh is about 35 percent to about 45 percent (for example, about 40 percent) polyester, about 10 percent to about 15 percent (for example, about 12 percent spandex), and about 35 percent to about 45 percent (for example, about 40 percent nylon).

In another sandwich mesh embodiment, the outer layer can be made of nylon and spandex, the spacer yarns can be nylon monofilament, and the inner layer can be made of polyester and spandex. In some of such sandwich mesh embodiments, the total composition of the sandwich mesh is about 60 percent to about 70 percent (for example, about 67 percent) nylon, about 5 percent to about 15 percent (for example, about 10 percent) spandex, and about 20 percent to about 25 percent (for example, about 23 percent) polyester.

In yet another sandwich mesh embodiment, the outer layer can be made of nylon (for example, about 45 percent to about 50 percent—for example, about 48 percent—of the total composition of the mesh), the spacer yarns can be nylon monofilament (for example, about 20 percent to about 25 percent—for example, about 23 percent—of the total composition of the mesh), and the inner layer can be made of polyester (for example, about 25 percent to about 30 percent—for example, about 29 percent—the total composition of the mesh).

In still another sandwich mesh embodiment, the outer layer can be made of a thermoplastic polyester; the inner layer can be made of polyester and spandex; and the spacer yarns can be made of polyester. In some of such sandwich mesh embodiments, the total composition of the sandwich mesh is about 35 percent to about 40 percent (for example, about 37 percent) thermoplastic polyurethane, about 5 percent to about 10 percent (for example, about 7 percent) spandex, and about 55 percent to about 60 percent (for example, about 56 percent) polyester.

In another sandwich mesh embodiment, the outer layer can be made of 210D nylon and 140D nylon; the inner layer can be made of 100D polyester and 75D polyester; and the spacer yarns can be nylon (for example, a nylon monofilament). In some of such sandwich mesh embodiments, the outer layer is about 25 percent to about 30 percent (for example, about 29 percent) 210 D nylon, and about 25 percent to about 35 percent (for example, about 26 percent) 140 D nylon; the inner layer is about 10 percent to about 20 percent (for example, about 15 percent) 100D polyester, and about 10 percent to about 15 percent (for example, about 14 percent 75D) polyester.

In one sandwich mesh embodiment, the outer layer can be polyester; the inner layer is polyester, and the spacer yarns are thermoplastic polyurethane.

In another sandwich mesh embodiment, the outer layer can be one or more of a low melt copolyamide (for example, K-140 yarn manufactured by EMS-Griltech), a polyamide (for example, nylon), polyester, and spandex; the inner layer can be one or more of a low melt copolyamide (for example, K-140 yarn manufactured by EMS-Griltech), a polyamide (for example, nylon), polyester, and spandex; and the spacer yarns can be one or more of polyester, polyamide (for example, nylon), and spandex. The low melt copolyamide has a low melting temperature, for example, equal to or less than about 180° C., and in some embodiments, equal to or less than about 140° C. In some embodiments, the low melt copolyamide has a melting peak of 132 degrees Celsius, and a melting range of about 97° C. to about 150° C. In some embodiments, the copolyamide has a lower melting temperature than the polyamide, polyester, or spandex used in the mesh. In some of such sandwich mesh embodiments, the outer and inner layers each comprise about 40 percent to about 60 percent (for example, about 50 percent) low melt polyamide and about 40 percent to about 60 percent (for example, about 50 percent) polyester. In other of such sandwich mesh embodiments, the outer and inner layers each comprise about 40 percent to about 50 percent (for example, 44 percent) low melt copolyamide, about 40 percent to about 50 percent (for example, about 44 percent) nylon, and about 10 percent to about 15 percent (for example, about 12 percent) spandex. And the spacer yarns comprise nylon monofilament.

In some embodiments, the upper 108 can be made, at least in part, of core yarn in which the outer sheath is made of a material having a lower melting temperature than the melting temperature of the core of the yarn.

In some sandwich mesh embodiments, the mesh is 100 of upper 108 percent nylon or 100 percent polyester. In some sandwich mesh embodiments, the mesh of upper 108 is 100 percent thermoplastic polyurethane. In some sandwich mesh embodiments, the mesh of upper 108 includes about 20 percent to about 30 percent (for example, about 25 percent) low melt co-polyester coated polyester yarn, and about 70 percent to about 80 percent (for example, about 75 percent) polyester yarn that form, for example, a circular knit or a flat knit. In some flat knit embodiments, the mesh of upper 108 includes about 25 percent to about 50 percent low melt co-polyester, and about 75 percent to about 50 percent polyester yarn.

Figure 5:
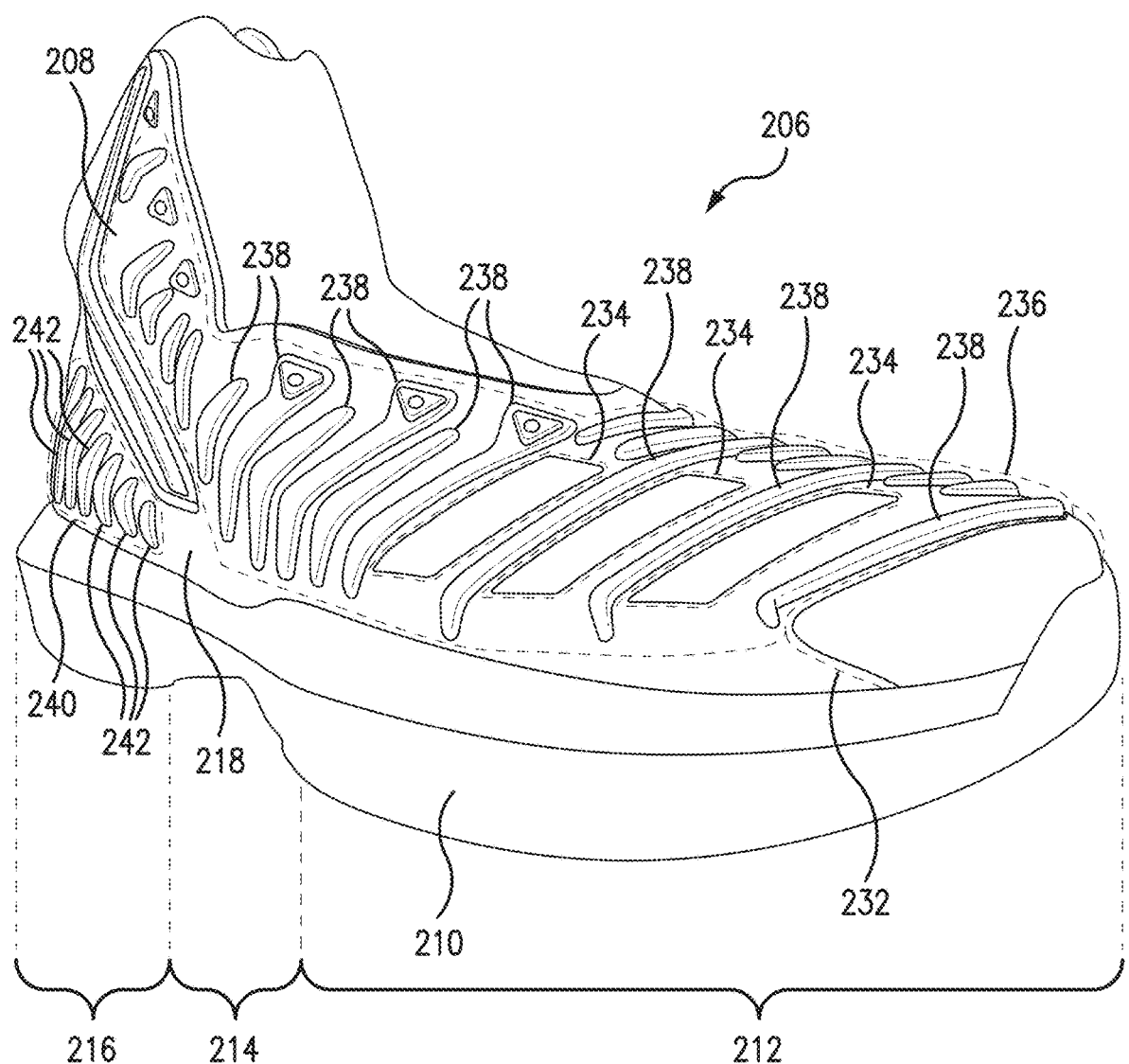
FIG. 5 is a perspective lateral side view of an article of footwear according to an embodiment.
Figure 6:
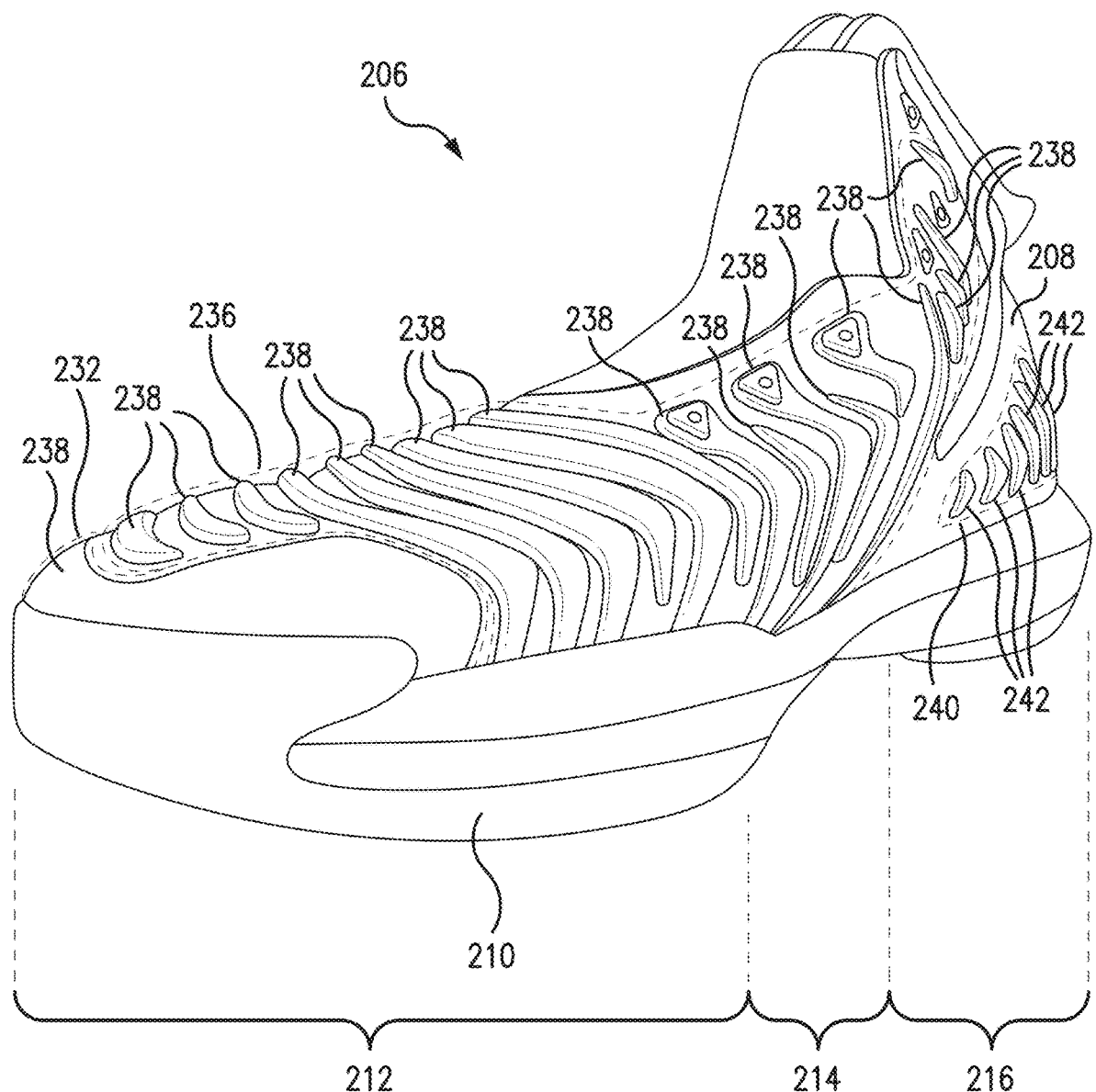
FIG. 6 is a perspective medial side view of an article of footwear according to an embodiment.
Figure 7:
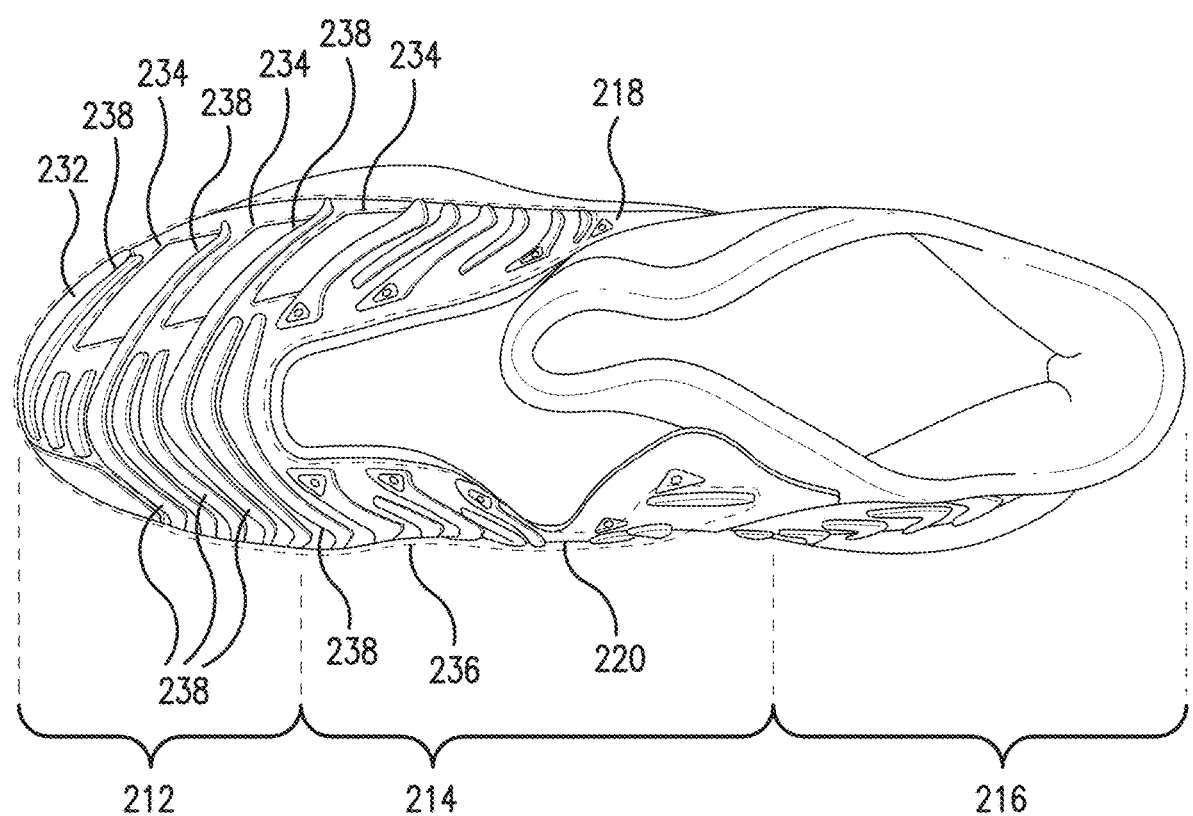
FIG. 7 is a plan view of an article of footwear according to an embodiment.

FIGS. 5-7 illustrate an article of footwear 206 that includes an upper that has at least one fabric portion having yarns partially fused to adjacent yarns and filaments fused to adjacent filaments, according to another embodiment. Article of footwear 206 includes an upper 208 and a sole 210 coupled to upper 208. Article of footwear 206 includes a forefoot region 212, a midfoot region 214, and a heel region 216. Article of footwear 206 also includes a lateral side 218 (see FIGS. 5 and 7) and a medial side 220 (see FIGS. 6 and 7) that each extend from forefoot region 212 to heel region 216.

Upper 208 can be made of, at least in part, a fabric having at least one partially fused portion in which yarns are partially fused to adjacent yarns and filaments of the partially fused yarns are partially fused to adjacent filaments. For example, as shown in FIGS. 5-7, upper 208 can have a first portion 232 that is partially fused. Partially fused portion 232 is in forefoot region 212 and overlaps with the distal ends of a user's toes in the forefoot region 212. Fused portion 232 wraps around the front edge of upper 208 from lateral side 218 to medial side 220. In some embodiments, fused portion 232 is embossed as shown.

Upper 208 also includes a plurality of portions 234 that are partially fused. Portions 234 are on lateral side 218 and spaced apart from each other. As best seen in FIGS. 5 and 7, partially fused portions 234 are substantially flat (not embossed) in some embodiments. In other embodiments, partially fused portions 234 are embossed. The partially fused portions 234 have a quadrilateral shape when viewed in plan. But in other embodiments, partially fused portions 234 can have other non-quadrilateral shape, for example, circular or oval shape.

Upper 208 also includes a region 236 that extends from forefoot region 212 to midfoot region 214 that includes a plurality of portions 238 that are partially fused and similarly shaped. Portions 238 of region 236 are on both lateral side 218 and medial side 220—some of which extend from lateral side 218 to medial side 220. As shown in FIGS. 5-7, partially fused portions 238 are non-linear elongated ribs that are spaced apart. In other embodiments (not shown), partially fused portions 238 can be linear or not elongated. As shown in FIG. 5, each of partially fused portions 234 are positioned between a respective pair of portions 238. In some embodiments, portions 238 are embossed.

Upper 208 also includes a region 240 at heel region 216 that includes a plurality of portions 242 that are partially fused. Partially fused portions 242 of region 240 are on both lateral side 218 and medial side 220. As shown in FIGS. 5-7, partially fused portions 242 are non-linear elongated ribs that are spaced apart. In some embodiments, the shape of partially fused portions 242 correspond to the shape of partially fused portions 238 in region 236. In other embodiments (not shown), portions 242 can be linear or not elongated. In some embodiments, partially fused portions 242 are embossed as shown. In other embodiments, partially fused portions 242 are not embossed.

Partially fused portions 232, 234, 238, and 242 can have tensile and tear mechanical properties that are advantageous for footwear applications. For example, each of partially fused portions 232, 234, 238, and 242 can have a tensile strength such that the respective partially fused portion displaces less than 10% of the respective partially fused fabric portion's unstressed dimension when a 100 N force is applied to the fabric portion in some embodiments. And in some embodiments, each of partially fused fabric portions 232, 234, 238, and 242 can also have a tensile strength such that the respective partially fused fabric portion does not plastically deform when a 150 N force is applied to the fabric portion in some embodiments. Additionally, each of partially fused fabric portions 232, 234, 238, and 242 can have a tear strength such that the respective portion does not tear when a 40 N force is applied to the portion in some embodiments.

Uppers having partially fused portions with one or more of the above mechanical properties have desired compliance, breathability, and support to be used for footwear, for example, shoes for leisure, running, soccer, American football, and basketball. That is, uppers having partially fused portions with one or more of the above mechanical properties are not too brittle or stiff to be used in footwear applications. Moreover, having at least one partially fused portion with one or more of the above mechanical properties allows upper 208 to be manufactured substantially as one unitary piece. In some one-piece embodiments, the fabric composing upper 208 is continuous from forefoot region 212 to heel region 216, and upper 208 is continuous from lateral side 218 to medial side 220. A one-piece upper 208 can reduce the total weight of article of footwear 106, improving user comfort and performance.

Upper 208 can be made of fabric and yarn as described in any one of the embodiments related to upper 108 above.

Now turning to embodiments of manufacturing uppers, for example, upper 108 and upper 208, having at least one partially fused portion, the partially fused portion(s) can be generated by thermal compression molding, RF welding, ultrasonic welding, or any other suitable molding technique.

For example, a thermal compression molding apparatus (e.g., a press having top and bottom heated plates that press against at least one mold) can be used to make uppers, for example, upper 108 and upper 208, having at least one partially fused portion. The thermal compressing molding apparatus is configured to apply heat to a fabric blank at a predetermined temperature and a predetermined pressure for a predetermined time period. In some embodiments, the fabric blank is positioned on a mold. At least a portion of the mold has raised or recessed surface portions that correspond to the partially fused portions on the upper. In some embodiments, the raised surface portions of the mold are configured to emboss the corresponding partially fused portions. The fabric blank can be single or multiple layers, have various constructions (for example, knitted or woven), and be made of various materials as described above with reference to uppers 108 and 208. In some embodiments, the mold is a single piece mold or a two-piece mold having top and bottom halves.

The mold is then placed onto the thermal compression molding apparatus, for example, between a heated top plate and a heated bottom plate. The thermal compression molding apparatus can include at least one hydraulic cylinder that drives the top plate and the bottom plate against the mold disposed in between to apply a predetermined amount of pressure to the fabric blank in the mold. The top and bottom plates can include heating elements that heat the top and bottom plates to a predetermined temperature and, in turn, heating the mold and the fabric blank in the mold to a desired temperature. Accordingly, in some embodiments, heat and pressure are applied to the fabric blank substantially simultaneously.

In some embodiments, applying heat to the fabric blank, for example, using a thermal compression molding apparatus, at a predetermined temperature and at a predetermined pressure for a predetermined time period partially fuses yarns to adjacent yarns and partially fuses filaments of the partially fused yarns to adjacent filaments. In such embodiments, the partially fused fabric portion can have tensile and tear mechanical properties that are advantageous for footwear applications. For example, applying heat to the fabric blank at a predetermined temperature and at a predetermined pressure for a predetermined time period can partially fuse yarns to adjacent yarns and partially fuse filaments of the partially fused yarns to adjacent filaments such that the partially fused portion can have a tensile strength such that the partially fused portion displaces less than 10% of the partially fused fabric portion's unstressed dimension when a 100 N force is applied to the fabric portion. And in some embodiments, the partially fused fabric portion can also have a tensile strength such that the partially fused fabric portion does not plastically deform when a 150 N force is applied to the fabric portion. Additionally, the partially fused fabric portion can have a tear strength such that the portion does not tear when a 40 N force is applied to the portion. In some embodiments, the partially fused portion will have one or more of these tensile and tear mechanical properties.

In some embodiments, at least one of the predetermined temperature, the predetermined pressure, and the predetermined time period is selected based on characteristics of the fabric forming fabric blank. Exemplary characteristics include the fabric construction type (e.g., woven, knitted, braided, netted, felted, plaited, single layer, multiple layer, etc.), yarn construction type (e.g., cabled yarn, core yarn, coated yarn, etc.), yarn weight (e.g., Denier), the color of the filaments forming the yarn, material content of the fabric (e.g., polyester, nylon, thermoplastic, spandex, and materials having different melting temperatures). For example, the below table illustrates the exemplary predetermined temperature ranges (in degrees Celsius) of the pressing plates for a thermal compression apparatus and time ranges (in seconds) for applying heat to a knitted fabric blank based on various characteristics (namely, material content and yarn construction):

| Exemplary Material Characteristics | Temp. | Time |
|---|---|---|
| 100% Nylon 6 | 180-195° C. | 30-45" |
| 100% Polyester | 220-230° C. | 40" |
| Nylon 6 + Polyester | 200-210° C. | 30-40" |
| 100% Thermoplastic Polyurethane | 140-150° C. | 5-10" |
| 100% Thermoplastic Polyurethane | 160-165° C. | 5-10" |
| Polyester Yarn Coated with Thermoplastic Polyurethane + Uncoated Polyester Yarn | 150-160° C. | 30-40" |
| Polyester Yarn Coated with a Low Melt Co-Polyamide | 110-115° C. | 5-10" |
| 100% low melt Co-Polyamide Yarn | 110-115° C. | 5-10" |
| 25% Polyester Yarn Coated with Low Melt Co-Polyester + 75% Uncoated, Flat Knit Polyester Yarn | 220-230° C. | 25-35" |
| Polyester Yarn Coated with Low Melt Co-Polyester + Circular Knit Polyester Yarn | 200-210° C. | 25-35" |

In some embodiments, the predetermined pressure for the knitted fabric blanks of the above table is about 5 kgf/cm$^2$ to about 100 kgf/cm$^2$ (for example, about 80 kgf/cm$^2$).

In some embodiments, in which the fabric blank comprises a knitted fabric composed of 90 percent nylon and 10 percent spandex, the predetermined temperature is selected to be in the range from about 180° C. to about 190° C. (for example, about 180° C. to about 184° C.), the predetermined time period is in the range from about 25 seconds to about 60 seconds (for example, about 45 seconds), and the predetermined pressure is about 5 kgf/cm$^2$ to about 100 kgf/cm$^2$ (for example, about 80 kgf/cm$^2$). The fabric blank is then than pressed at the selected parameters.

In some embodiments, in which the fabric blank comprises a knitted sandwich mesh fabric in which (a) the top layer is about 25 percent to about 30 percent (for example, about 29 percent) 210D nylon, and about 25 percent to about 30 percent (for example, about 26 percent) 140D nylon, (b) the spacer yarns are about 16 percent nylon monofilament, and (c) the inner layer is about 10 percent to about 20 percent (for example, about 15 percent) 100D polyester and about 10 percent to about 15 percent (for example, about 14 about percent) 75D polyester, the predetermined temperature is selected to be in the range of about 210° C. to about 215° C., the predetermined time period is selected to be in the range of about 25 second to about 30 seconds (for example, about 30 seconds), and the predetermined pressure is selected to be about 5 kgf/cm$^2$. The fabric blank is then than pressed at the selected parameters.

In some embodiments, in which the fabric blank comprises a knitted sandwich mesh fabric in which the top layer is polyester, the spacer yarns are thermoplastic polyurethane, and the inner layer is a polyester, the predetermined temperature is selected to be in the range of about 145° C. to about 155° C., the predetermined time period is selected to be in the range of about 20 seconds, and the predetermined pressure is about 5 kgf/cm$^2$. The fabric blank is then than pressed at the selected parameters.

In some embodiments in which the fabric blank is a knitted sandwich mesh in which the outer layer is a low melt copolyamide (for example, K-140 yarn manufactured by EMS-Griltech), the inner layer is a low melt copolyamide (for example, K-140 yarn manufactured by EMS-Griltech), and the spacer yarns are polyester, the predetermined temperature is selected to be in the range of about 115° C. to about 120° C. (for example, about 117° C.), the predetermined time period is selected to be in the range from about 25 seconds to about 35 seconds (for example, about 30 seconds), and the predetermined pressure is about 5 kgf/cm$^2$. The fabric blank is then than pressed at the selected parameters.

In some embodiments in which the fabric blank is a knitted sandwich mesh in which (a) the outer layer is a thermoplastic polyurethane, (b) the spacer yarns are polyester, and (c) the inner layer is polyester and spandex with the total composition of the mesh being about 35 percent to about 40 percent (for example, about 37 percent) thermoplastic polyurethane, about 5 percent to about 10 percent (for example, about 7 percent) spandex, and about 55 percent to about 60 percent (for example, about 56 percent) polyester, the predetermined temperature is selected to be in the range of about 160° C. to about 185° C. (for example, about 165° C. or about 175° C.), the predetermined time period is selected to be in the range from about 25 seconds to about 35 seconds (for example, about 30 seconds), and the predetermined pressure selected to be about 5 kgf/cm$^2$. The fabric blank is then than pressed at the selected parameters.

Figure 8:
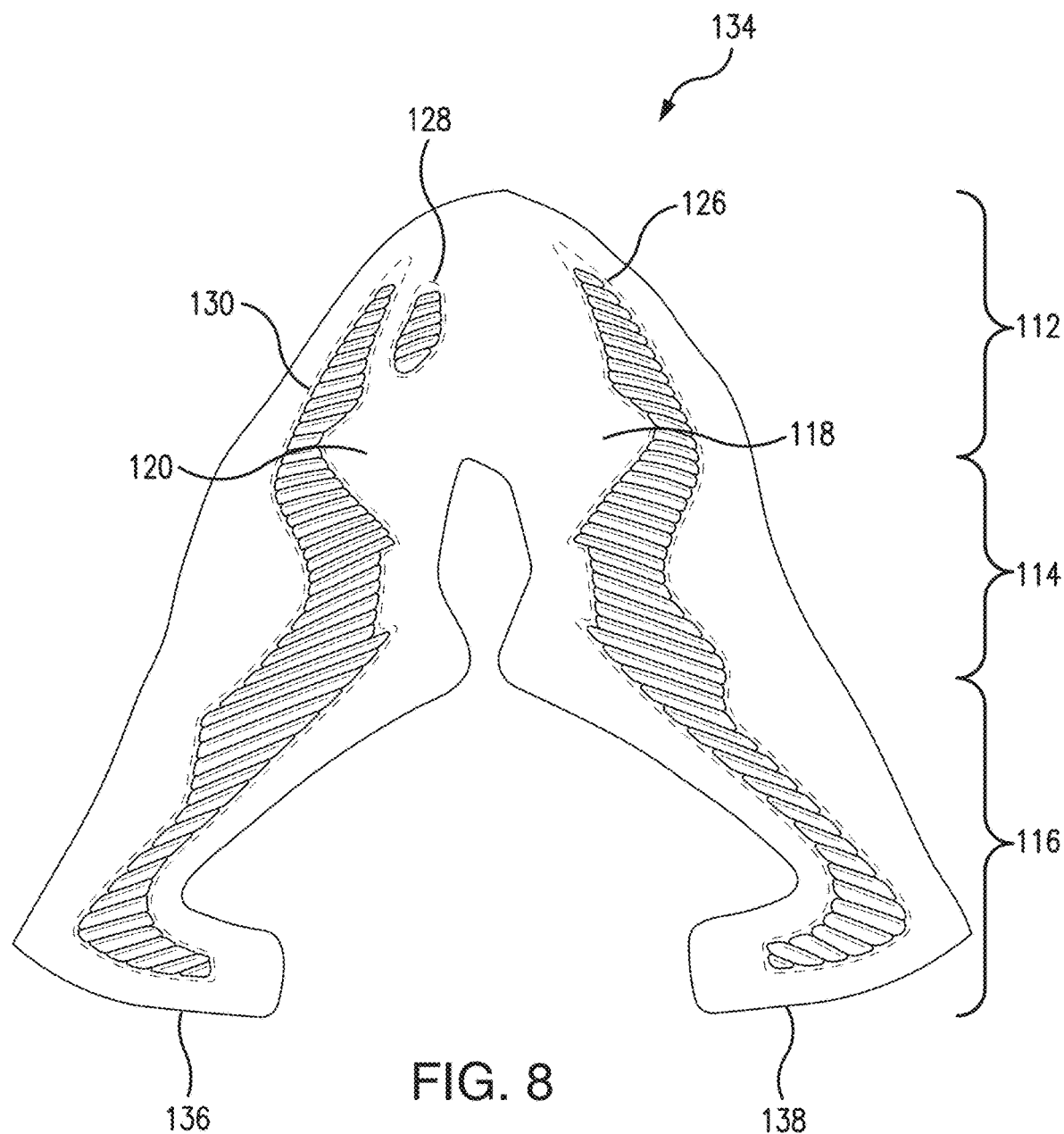
FIG. 8 is a plan view of a fabric blank used to form an upper an article of footwear according to an embodiment.

After applying heat to the fabric blank at a predetermined temperature and at a predetermined pressure for a predetermined time period, the fabric blank is removed from the mold. Then the fabric blank can be cut, for example, by die cutting, laser cutting, water jet cutting, or reciprocating knife cutting, to a desired shape. FIG. 8 illustrates an exemplary fabric blank 134 for upper 108 that has been cut after applying heat to the fabric blank to form partially fused portions 128, 130, and 132. The cut fabric blank 134 has opposing ends 136 and 138 on medial and lateral sides 120, 118, respectively.

Next, the cut fabric blank is formed into an upper of the article of footwear. For example, referring to FIG. 8, ends 136 and 138 of cut fabric blank 134 are coupled together, for example, stitched together. A back strip of material may be coupled to, for example, sewn or adhered, to the inside or outside of fabric blank 134 at the seam at which ends 136 and 138 are stitched together to form upper 700. In some embodiments (not shown in FIG. 8), fabric blank 134 is configured with a bellows tongue arrangement to allow for a one piece construction and thereby reducing the number of upper pieces and manufacturing steps required. In other embodiments, a tongue (not shown) in FIG. 8, is coupled, for example, sewn, to fabric blank 134. And then, in some embodiments, cut fabric blank 134 is shaped over a last (not shown), and an interlining and/or a strobel sock are coupled to fabric blank 134 to form the upper of the article of footwear. In some embodiments, the separate tongue is also pressed to form partially fused portions as described above.

In some embodiments, the fabric blank is embroidered before or after heat is applied to the fabric blank to partially fuse at least one portion of the fabric blank. Embroidering the fabric blank can increase the tear strength of the partially fused portion(s) of the fabric blank. In some embodiments, the predetermined temperature at which the fabric blank is heated is based on whether the fabric blank is embroidered. For example, in some embodiments, the predetermined temperature at which an embroidered fabric blank is heated can be higher than the predetermined temperature at which an unembroidered fabric blank is heated.

In some embodiments, the method of manufacturing uppers having at least one partially fused portion also includes heat transfer printing (also known as sublimation transfer printing). A design can be preprinted on transfer paper with disperse dyes that sublime onto the fabric upper. The heat transfer paper with the design is placed in the mold in contact with the fabric blank. The mold is then placed onto the thermal compression molding apparatus, and heat and pressure are applied to the transfer paper and fabric blank to transfer the design from the paper onto the fabric blank and to partially fuse a portion of the fabric blank.

In one heat transfer printing embodiment, the transfer paper and fabric blank are heated to a first temperature (for example, about 140° C. to about 160° C., e.g., about 150° C.) to transfer the design to the fabric blank. Then the mold is removed from the compression molding apparatus and the transfer paper is removed from the mold. The mold is then placed back onto the thermal compression molding apparatus, and heated to a second temperature higher than the first temperature (for example, about 180° C. to about 190° C., e.g., about 180° C.) to partially fuse a portion of the fabric blank. Then the mold is removed from the compression molding apparatus, and the fabric blank with a partially fused portion are removed from the mold. The fabric blank can then be formed into an upper.

In another heat transfer printing embodiment, the transfer paper and fabric blank are heated to a temperature (for example, about 180° C. to about 190° C., e.g., about 180° C.) to both transfer the design to the fabric blank and to partially fuse a portion of the fabric blank. Then the mold is removed from the compression molding apparatus, and the transfer paper and the fabric blank with a partially fused portion are removed from the mold. The fabric blank can then be formed into an upper.

In some heat transfer printing embodiment, a portion of the design transferred from the transfer paper is positioned on the partially fused portion of the upper.

While various embodiments have been discussed herein in the context of footwear, other articles of apparel may be manufactured using fabric having at least one partially fused portion. Other articles of apparel include, but are not limited to, pants, shorts, leggings, a sock, a jacket, a coat, a hat, a sleeve, a sweater, a jersey, a bootie, and a glove. In some embodiments, the fabric on areas of apparel that are subject to excessive wear and tear can be partially fused for durability. For example, the fabric at the knee area of pants can be partially fused to provide increase durability to the knee area, and the fabric at the elbow area of shirts, jackets, and coats can be partially fused to provide increase durability to the elbow area. In some embodiments, the fabric of apparel can be partially fused and embossed with aesthetic pattern. For example, any one of pants, shorts, leggings, a sock, a jacket, a coat, a hat, a sleeve, a sweater, a jersey, a bootie, and a glove can be embossed with aesthetic pattern. And in some embodiments, any one of pants, shorts, leggings, a sock, a jacket, a coat, a hat, a sleeve, a sweater, a jersey, a bootie, and a glove can be partially fused to increase the strength of the fabric and reduce number of required layers or materials to manufacture the apparel item, decreasing both weight and manufacturing costs of the apparel item.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A method of manufacturing an upper for an article of footwear, the method comprising:
   applying heat at a temperature between 180 to 190 degrees Celsius to a fabric for a duration of between 25 to 60 seconds to form a fused portion, the application of heat resulting in the fused portion having a tensile strength such that the fused portion displaces less than 10% of an unstressed dimension of the fused portion when a 100 N tensile force is applied to the fused portion, and a tear strength such that the fused portion does not tear when a 40 N tearing force is applied to the fused portion; and
   forming the upper of for the article of footwear from the fabric comprising the fused portion.

2. The method of claim 1, wherein the heat is applied for a duration of 45 seconds and the tensile strength is such that the fused portion does not plastically deform when a 150 N tensile force is applied to the fused portion.

3. The method of claim 1, wherein the applying heat to the fabric occurs simultaneously with an application of between 5 to 100 kgf/cm$^2$ of pressure to the fabric.

4. The method of claim 1, wherein the applying heat further comprises pressing the fabric in a mold.

5. The method of claim 1, wherein the fabric is a sandwich mesh comprising a first layer, a second layer, and spacer yarns between the first layer and the second layer.

6. The method of claim 5, wherein the first layer comprises a thermoplastic, the second layer comprises polyester and spandex, and the spacer yarns comprise polyester.

7. The method of claim 5, wherein the sandwich mesh comprises nylon and spandex.

8. The method of claim 1, further comprising:
   applying pressure simultaneously with the application of heat, wherein the applying heat and pressure to the fabric comprises embossing the fused portion to form a plurality of substantially linear ribs that are raised above an unfused surface of the fabric.

9. The method of claim 8, wherein the ribs are formed with substantially even spacing.

10. The method of claim 9, wherein each of the ribs is formed with a substantially semi-circular cross section.

11. A method of manufacturing an article of footwear, the method comprising:
    applying heat at a temperature between 165 to 185 degrees Celsius to a fabric and a pressure of 5 kgf/cm$^2$ to the fabric for a time period of between 25 to 35 seconds to form a partially fused portion, such that, after the applying heat and pressure to the fabric, a portion of the fabric comprises yarns that are partially fused to adjacent yarns and filaments of the partially fused yarns that are partially fused to adjacent filaments, wherein the partially fused portion displaces less than 10% of an unstressed dimension of the partially fused portion when a 100 N tensile force is applied to the partially fused portion;
    forming an upper of the article of footwear from the fabric comprising the partially fused portion; and
    coupling the upper to a sole.

12. The method of claim 11, wherein the applying heat to the fabric occurs simultaneously with the application of the pressure.

13. The method of claim 12, wherein the applying heat and pressure to the fabric comprises pressing the fabric in a mold.

14. The method of claim 11, wherein the fabric is a sandwich mesh comprising a first layer, a second layer, and spacer yarns between the first layer and the second layer.

15. The method of claim 14, wherein the first layer comprises a thermoplastic, the second layer comprises polyester and spandex, and the spacer yarns comprise polyester.

16. The method of claim 15, wherein the sandwich mesh comprises nylon and spandex.

17. The method of claim 11, wherein the applying heat and pressure to the fabric comprises embossing the partially fused portion.

* * * * *